United States Patent [19]

King

[11] Patent Number: 6,055,224

[45] Date of Patent: *Apr. 25, 2000

[54] METHOD AND SYSTEM FOR HANDLING TELECOMMUNICATIONS DATA TRAFFIC

[75] Inventor: George King, Pompano Beach, Fla.

[73] Assignee: Siemens Information and Communicatiion Networks, Inc., Boca Raton, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/774,344

[22] Filed: Dec. 30, 1996

[51] Int. Cl.⁷ .............................. G06F 11/00; H04L 12/56; H04M 3/00
[52] U.S. Cl. .................... 370/217; 370/221; 370/401; 379/273
[58] Field of Search ........................... 370/220, 221, 370/217–270, 419, 420, 401, 522, 474; 379/271, 273, 279, 213; 341/67

[56] References Cited

U.S. PATENT DOCUMENTS

| | | | |
|---|---|---|---|
| 5,220,325 | 6/1993 | Ackland et al. | 341/67 |
| 5,371,868 | 12/1994 | Koning et al. | 395/400 |
| 5,526,353 | 6/1996 | Henley et al. | 370/474 |
| 5,563,884 | 10/1996 | Fimoff et al. | 370/84 |

*Primary Examiner*—Alpus H. Hsu
*Assistant Examiner*—Afsar M. Qureshi
*Attorney, Agent, or Firm*—Joseph S. Codispoti

[57] ABSTRACT

A method and device for (a) generating a constant rate data stream from data, (b) providing, via a termination unit, the constant rate data stream to a router, and (c) assigning an address to the termination unit. The method and device permit the data to bypass a switching network of a central office.

18 Claims, 15 Drawing Sheets

METHOD AND SYSTEM FOR HANDLING TELECOMMUNICATIONS DATA TRAFFIC

TECHNICAL FIELD

The invention generally relates to the communication of data from a source device to a destination device. More particularly, the invention relates to a method and device for communicating data from a source device, using local facilities, to a destination device without encumbering the switching network of a central office of a telephone service provider.

BACKGROUND

Overview of the Telephone System

The station equipment and transmission facilities used by regional Bell operating companies (or "RBOCs") and other telephone service providers are well-known. FIG. 6 is a block diagram which illustrates the use of transmission facilities by various types of telecommunications services. As shown in FIG. 6, a number of geographically remote central switching offices 620a, 620b are coupled via "trunks" 614 and interoffice transmission facilities 618. Various entities, such as residences 602a, 602b, businesses 604a, 604b, and private branch exchanges (or "PBXs") 606a, 606b are coupled with a central switching office 620a, 620b via "lines" 610, 612 and "loop transmission facilities" 608.

Thus, a loop transmission facility (or "subscriber loop") 608 connects telecommunication equipment at a customer premises (e.g., a residence, business, etc.) with an associated central switching office 620a, 620b. The loop transmission facility 608 is typically on the order of a few miles and usually includes paired copper wire (also referred to as "twisted pair"). Interoffice transmission facilities 618, or trunks, connect different central switching offices 620a, 620b. Interoffice transmission facilities 618 range from less than one mile to thousands of miles.

Overview of a Central Office Switch

FIG. 1a is a high level block diagram of equipment which is typically used at a switching office (or "central office") 620. Lines 4 (such as twisted-pairs of the loop transmission facility 608 for example) carrying analog signals (such as signals from telephones or modems for example) are terminated at a subscriber line interface circuit (or "SLIC") (not shown) of an analog subscriber line module (not shown) of a digital line unit 2, 6. Digital signals (such as signals from an ISDN terminal) are terminated at analog and digital subscriber line interface circuits (not shown) in the digital line units 2, 6.

Lines 14 and 16 (e.g., T1 links carrying up to 1.544 Mbps, which can handle 24–64 Kbps voice channels) from the digital line units 2, 6 are provided to a switch interface module 12. In addition, a digital trunk(s) 10 may be provided to a switch interface module 12.

The switch interface module 12 interfaces the incoming lines (e.g., 14, 16, and 10) to a switching network 20. For example, in a 5ESS™ switch (sold by Lucent Technologies—formerly part of AT&T), each of the switch interface modules includes a time slot exchange which re-orders the time slots of incoming time multiplexed channels based on transfer logic. Each interface module provides, via two optical fiber links, 512 time division multiplexed channels to a time multiplexed switch.

The switching network 20 provides a connection between a caller and a called line. In the 5ESS™ switch, the switching network includes a time multiplexed switch that can be thought of as a cross bar switch having cross connected states which change with changing time slots.

Example of Operation of a Central Office Switch

FIG. 1b is a block diagram of an EWSD® switch, sold by Siemens Stromberg-Carlson, in which dialing and connection operations are shown. Each of the line trunk groups 108 and 158 (which can be thought of as a switch interface module) includes (i) a digital interface unit 110 or 160, (ii) a group switch (or peripheral switch matrix) 128 or 178, (iii) a link interface unit 130 or 180, (iv) a group processor 112 or 162, (v) a tone generator 126 or 176, and (vi) a code receiver 116 or 166. The digital interface units 110 and 160 adapt incoming T1 carriers from the digital line units 106 and 156, respectively, to internal speech and signaling paths of their line trunk groups 108 and 158, respectively. The group switches 128 and 178 are non-blocking switching stages which interconnect the functional units of their line trunk groups 108 and 158, respectively, via speech paths. The link interface units 130 and 180 transmit speech and data from the group switches 128 and 178, respectively, over a 128 channel carrier to and from switching network(s) 122. The group processors 112 and 162 are microprocessor based units that control all activities of their line trunk groups 108 and 158, respectively. The tone generators 126 and 176 generate dual tone multi-frequency (or "DTMF") and MF-R1 tones for line and trunk signaling. The code receivers 116 and 166 detect the multi-frequency DTMF and MF-R1 tones used for subscriber line and trunk signaling.

In the following example, it is assumed that a line has already been seized by telephone A 102 and a dial tone has been provided, via path 190a, to telephone A 102.

At telephone A 102, the subscriber enters digits by pressing push-buttons of the telephone's keypad. The digital line unit 106 detects the first digit and sends two messages to the group processor 112. The first message, provided to the signaling line control unit 114 via signal path 192, asserts that a digit has been detected. The second message contains signals (or bits) defining the first digit. More specifically, a DTMF generator at the telephone A 102 generates a dual tone in response to the push-button pressed by the subscriber. This dual tone is sent, in-band, via digital I/O unit 110 and group switch 128, to code receiver 116. The code receiver 116 decodes the dual tone, in-band, signal and provides the decoded value to the processor module unit 118 via signal path 194.

Subsequent digits are similarly provided to the processor module unit 118. Once the processor module unit 118 determines that the digits are sufficient for interpretation, it sends the digits, via signal path 196, to the central processor 120. The central processor 120 queries an appropriate data base to determine port assignments for the line trunk group 158 and digital line unit 156 of telephone B 104. The port assignments are then marked busy and the central processor commands the switching network 122 to establish a path between the assigned speech channels in the line trunk groups 108 and 158.

Assuming that telephone B goes off-hook in response to ringing signals from tone generator 176, a voice channel between telephones A and B 102 and 104, respectively, is established via paths 190b, 199a, 198, and 199b.

Concentration

The digital lines units 2, 6, as well as the switch interface module(s) 12 may, inter alia, operate to concentrate traffic.

To ensure that each line (see e.g., lines 4 and 8) can always access an idle path on the switching network 20, the switching network 20 may be engineered to provide a number of paths equal to the number of lines. However, such an arrangement is usually not cost effective in the real world. Specifically, the amount of traffic handled by a switching network 20 can be measured and/or estimated. The unit hundred call seconds (or "CCS") is used when describing network traffic during peak hours. For example, "36 CCS" means that a line is being used constantly (i.e., 3600 seconds per hour) during a given time period.

The switching network 20 is designed and engineered based on anticipated traffic. If the expected traffic volume is relatively low, more loops can be serviced by fewer paths through the switch. Conversely, if the expected traffic volume is relatively high, more switching paths are needed to service the loops. In most residential areas, the central office switch is engineered for 2 CCS, in most business areas, the central office switch is engineered for 3CCS, and in urban areas, the central office switch is often engineered for 4 to 6 CCS. Thus, the switching network 20 can be more highly concentrated in residential areas than urban business areas for example. Concentration may also take place at the switch interface modules 12 and digital line units 2, 6.

Problem of Internet Usage

Internet service providers (or "ISPs") or enhanced service providers (or "ESPs") have experienced explosive growth during the mid-1990s as users desire access to the Internet and other private or public networks. This explosive growth, coupled with the typical usage patterns of the Internet, has created unique service problems for RBOCs and other telephone service providers. In many instances, users, accessing the Internet through a local Internet provider, may occupy a line, maintained by the switching network of a central office, almost continuously during certain hours. Further, Internet service providers have typically bought small numbers of 1MB (or "1 Message Business") lines; 1MB being a tariffed service developed to handle voice traffic of about 3 CCS (or 3 hundred call seconds). Consequently, a central office having a switching network engineered for traffic expected to be 3 CCS, or even 6 CCS, must handle traffic which, in many instances, approaches 36 CCS.

It was first thought that most Internet or on-line activity would occur during early morning hours. If this were the case, such heavy "data type" usage during light traffic periods would have better utilized embedded investment in switching and transmission facilities, thereby contributing to the revenue stream of RBOCs and other telephone service providers at times when very few calls are made. Unfortunately, however, Internet use is heavy during the daytime. This unanticipated heavy traffic caused by high usage customers, such as Internet service providers for example, has loaded down switching networks and associated digital line units at central offices of RBOCs and other telephone service providers.

RBOCs and other telephone service providers are regulated by the Public Service Commission and must meet certain minimum service level requirements. For example, ordinary telephone customers expect, and the Public Service Commission requires, that dial tone will be provided when a customer takes the handset of their telephone off-hook. However, in instances where high usage customers, such as Internet service providers, are encouraging usage of a central office switching network far in excess of its engineered capacity, service level problems (e.g., no dial tone) may result.

In the past, the average call lasted about three minutes. However, it has been reported that the average Internet session lasts about 20 minutes. As discussed above, central offices were simply not designed and engineered to handle the increased levels of traffic caused by Internet (and other data access) users. Additional resources are required to increase the capacity of the central office to handle such traffic.

Overview of ISDN

Coinciding with the explosive growth of Internet associated traffic, many telephone service providers are rapidly upgrading their systems for all-digital operation. Such all-digital systems will permit fast and robust data transmission and switching. It is intended that the subscriber interface to this all-digital system will have sufficient capacity to handle voice communications and data communications concurrently. Such networks are referred to as integrated services digital networks (or "ISDNs") and are well-known.

Basic ISDN service may be carried over two twisted-pairs, up to about 1 Km from a central office (or repeater). The basic ISDN service (also referred to as "2B+D service") includes two 64 Kbps bearer (or "B") channels and one 16 Kbps data (or "D") channel. One or both of the bearer channels can carry voice and/or data. The data channel carries control signals used, e.g., to set up and break down calls. The linked access procedure-D (or "LAPD") protocol may be used at the link layer (i.e., the layer of the International Standards Organization (or "ISO") seven layer reference model used for data link control) and the Q.931 protocol may be used for messaging. Two-binary, one quaternary (or "2B1Q") encoding may be used for the physical layer (i.e., the layer of the ISO reference model used to define mechanical and electrical network interfaces).

FIG. 2 is a block diagram illustrating different equipment and connection points in an ISDN system. A network termination type 1 (or "NT1") equipment 202 terminates a physical connection (e.g., via two twisted-pair) between a customer site and a local exchange (or "LE") in an ISDN network. A "T" access point 204 provides access for basic bearer services and primary rate services. A network termination type 2 (or "NT2") equipment 206, such as a PBX or LAN for example, may be employed to provide customer site switching, multiplexing, and concentration. An "S" access point 208 provides access for supplementary bearer services (e.g., an enhanced connection incorporating layers 1–3 of the ISO reference model). Terminal equipment type 1 (or "TE1") 210 supports ISDN services and uses the ISDN protocol. On the other hand, terminal equipment type 2 (or "TE2") 218 is non-IDSN compatible; a terminal adapter (or "TA") 214 is needed to permit such non-ISDN compatible equipment (e.g., analog telephones, X.25 data terminal equipment, personal computers, etc.) to communicate with the network. An "R" access point 216 permits access by existing interface standards. Up to eight (8) independent NT1s or TAs may be connected to an "S" access point. A contention control scheme allows the various units to time-share the use of the two bearer (or B) channels and one data (or D) channel in a fair way.

At a local exchange, ISDN data may be communicated via a (a) circuit switching, (b) frame relay or frame switching, or (c) packet switching, interface protocols. Irrespective of the type of interface protocol used, a circuit or virtual path must first be set up through the switching network (recall e.g., switching network 20 of FIG. 2) before any user data is transferred. For example, the block diagram of FIG. 3*a* illustrates a circuit switching interface protocol for communication between terminal equipment/terminal adapter 302 and 304. The terminal equipment/terminal adapter 302 exchanges signaling messages with its local exchange 316 over the data channel 310, via network termination equipment 332, using a three-layer (ISO) control stack 308. Similarly, the terminal equipment/terminal adapter 304 exchanges signaling messages with its local exchange 318 over the data channel 322, via network termination equipment 330, using a three-layer (ISO) control stack 326. Within the network, a separate signaling network 312, which involves the full seven-layer (ISO) protocol stack 314, 328, is used to set up the necessary circuits or virtual paths through the network. The circuit is set up in the same way as a public switched telephone network circuit. Once set up, the circuit provides a transparent 64 Kbps transmission path.

The block diagram of FIG. 3b illustrates a frame relay or frame switching interface protocol for communication between terminal equipment/terminal adapter 302' and 304'. As shown in FIG. 3b, additional routing information 350, 352 (i.e., layer 2 (ISO) of the control stacks 308', 326') are retained at each intermediate exchange thereby permitting subsequent frames of user data to be routed (or relayed) across a set up virtual path.

The block diagram of FIG. 3c illustrates a packet switching interface protocol for communication between terminal equipment/terminal adapter 302" and 304". As shown in FIG. 3c, additional routing information 360, 362 (i.e., layer 3 (ISO) of the control stacks 308", 326") are used for multiple call set-up, routing, and flow control.

To reiterate, each of the ISDN interface protocols provide for the transmission of data through the switching network. Accordingly, the IDSN protocol will not significantly decrease traffic or alleviate blockages at existing switching equipment or line units—indeed, ISDN was never intended to be used for this purpose. Thus, a method and system is needed to reduce the traffic handled by the switching network and/or switch interface modules (See e.g., the line trunk groups 108 and 158 of FIG. 1b.). Such a method and system should use existing equipment to the maximum extent possible. For example, line maintenance operations should be performed by existing equipment. The method should be capable of implementation at a central office or at a customer's premises. Finally, the method and system should allow telephone companies to forward data to Internet service providers—again without burdening the switching network or switch interface modules at the central office.

SUMMARY OF THE INVENTION

The aforementioned problems are obviated by the present invention which reduces the traffic handled by the switching network and/or switch interface modules. The invention particularly provides a method and device for (a) generating a constant rate data stream from data, (b) providing, via a termination unit, the constant rate data stream to a router, and (c) assigning an address to the termination unit. The router may then route the constant rate data stream based on destination information contained in the data stream. If the termination unit is on a subscriber line module of a digital line unit of a central office switch which includes a switch interface module and/or a switching network, the constant rate data stream is provided to the router such that the constant rate data stream bypasses the switch interface module and/or the switching network. If, on the other hand, the termination unit is on a remote line termination unit having a link to a central office, the constant rate data stream is provided to the router such that the constant rate data stream bypasses the central office.

If the data is encapsulated (e.g., packetized or framed), the constant rate data stream may be generated by buffering the data and clocking out the buffered data to achieve the constant rate data stream. If, on the other hand, the data is not encapsuled, the constant rate data stream may be generated by encapsulating the data, to generate capsules of data; buffering the capsules of data; and clocking out the buffered capsules of data to achieve the constant rate data stream. The constant rate of the data stream may be 64 Kbps or 128 Kbps.

The address assigned to the termination unit can be a temporary address. The address to the termination unit may be assigned by generating a table in which the temporary address is associated with the termination unit, and storing the table. If the termination unit is coupled with an associated line unit interface at an address assignment unit, the line unit interface is assigned to the address.

The present invention also provides a device for communicating data from a first location, via a central office having at least one digital line unit, to a router at a second location. The device includes a data transceiver, a first link, a line termination unit, a second link, and an address assignment unit. The data transceiver is located at the first location, accepts the data, and generates a constant rate data stream from the data. The first link is coupled with the data transceiver, and carries the constant rate data stream generated by the data transceiver. The line termination unit is located on the digital line unit, and terminates the first link. The second link is coupled with the line termination unit, and carries the constant rate data stream. Finally, the address assignment unit terminates the second link, assigns an address to the line termination unit, and provides the constant rate data stream to the router.

The line termination unit may be a basic rate interface. The address assignment unit may include a line termination unit interface, a storage device, a processor, a router interface, and a bus system. The line termination unit interface terminates the second link. The storage device stores a program for execution by the processor. The router interface terminates a link to the router. Finally, the bus system is shared by the line termination unit interface, the processor, and the router interface (and perhaps the storage device(s)), and facilitates communication between these units.

The storage device may store a look up table in which the line termination unit is associated with the address assigned to it. Alternatively, the storage device may store a look up table in which the line termination unit interface is associated with the address assigned to the line termination unit coupled with the line termination unit interface via the second link.

The present invention also provides a device for communicating data from a first location to a router. The first location has a remote line termination unit which is coupled, via a link, with a central office. The device includes a data transceiver, a first link, a line termination node, a second link, and an address assignment unit. The data transceiver is located at the first location, accepts the data, and generates a constant rate data stream from the data. The first link is coupled with the data transceiver, and carries the constant rate data stream generated by the data transceiver. The line termination node is located on the remote line termination unit, and terminates the first link. The second link is coupled with the line termination node, and carries the constant rate data stream. Finally, the address assignment unit terminates the second link, assigns an address to the line termination node, and provides the constant rate data stream to the router.

Further, the address assignment unit may include a line termination node interface, a storage device, a processor, a router interface, and a bus system. The line termination node interface terminates the second link. The storage device stores a program for execution by the processor. The router interface terminates a link to the router. Finally, the bus system is shared by the line termination node interface, the processor, and the router interface (and perhaps the storage device(s)), and facilitates communication between these units.

The storage device may store a look up table in which the line termination node is associated with the address assigned to it. Alternatively, the storage device may store a look up table in which the line termination node interface is associated with the address assigned to the line termination node coupled with the line termination node via the second link.

Lastly, in a central office having (i) a digital line unit having a subscriber line module which terminates a number of local lines, (ii) a switch interface module coupled with the digital line unit, and (iii) a switching network coupled with the switch interface module, the present invention provides a device for communicating a constant rate data stream, received on one of the local lines, to a router, such that the constant rate data stream bypasses the switching network. The device includes a line termination unit, a link, and an address assignment unit. The line termination unit is located on the digital line unit, and terminates the local line. The link is coupled with the line termination unit, and carries the constant rate data stream. Lastly, the address assignment unit terminates the link, assigns an address to the line termination unit, and provides the constant rate data stream to the router.

The line termination unit may be a basic rate interface. The address assignment unit may include a line termination unit interface, a storage device, a processor, a router interface, and a bus system. The line termination unit interface terminates the link. The storage device stores a program for execution by the processor. The router interface terminates a link to the router. Lastly, the bus system is shared by the line termination unit interface (and perhaps the storage device(s)), the processor, and the router interface and facilitates communication between these units.

The storage device may store a look up table in which the line termination unit is associated with the address assigned to it. Alternatively, the storage device stores a look up table in which the line termination unit interface is associated with the address assigned to the line termination unit coupled with the line termination unit interface via the link.

Advantageously, the invention provides a low cost Internet (or other network such as a private LAN or WAN) access at a central office, a remote digital terminal, or subscriber line interface circuit (or "SLIC") without placing additional burdens on switch interface modules and an associated switching network. Briefly, the invention accomplishes this by (i) providing an appropriate data transceiver (or protocol adapter) at the customer premises, and (ii) off-loading such network access lines at a digital line unit. The off-loaded lines are provided to a router rather than the switching network.

BRIEF DESCRIPTION OF THE DRAWINGS

For a better understanding of the invention, reference is made to the following description of an exemplary embodiment thereof, and to the accompanying drawings, wherein.

DETAILED DESCRIPTION

Figure 2:
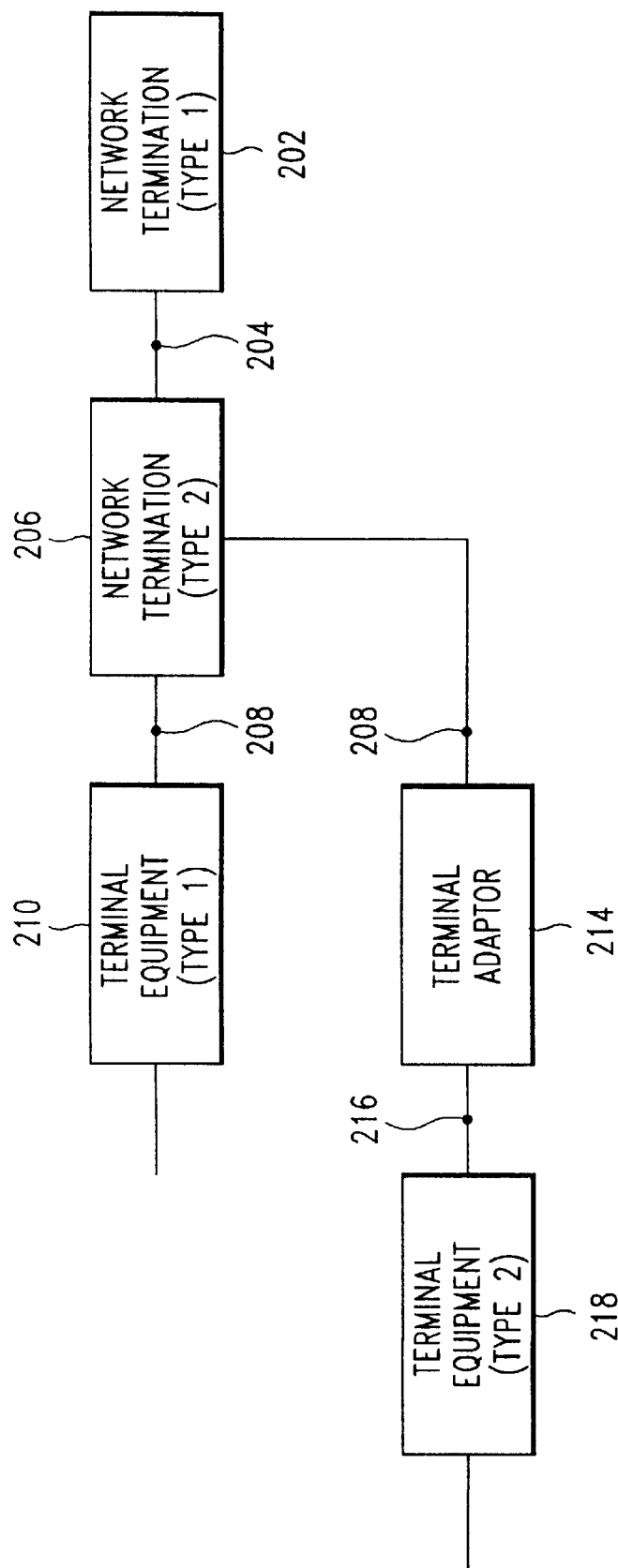
FIG. 2 illustrates equipment and access points in an ISDN network.
Figure 3A:
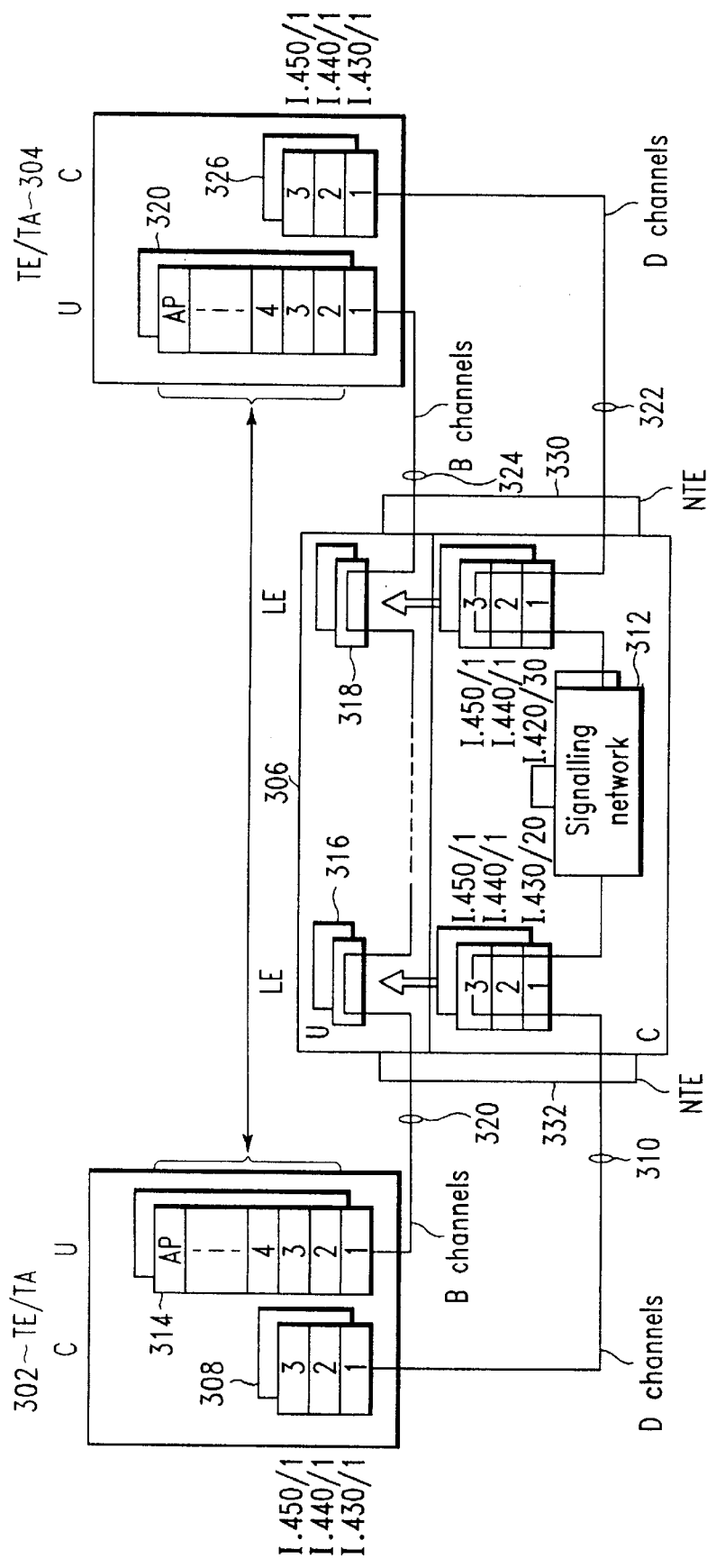
FIGS. 3a through 3c illustrate the set up of circuits or paths in accordance with various ISDN interface protocols.
Figure 3B:
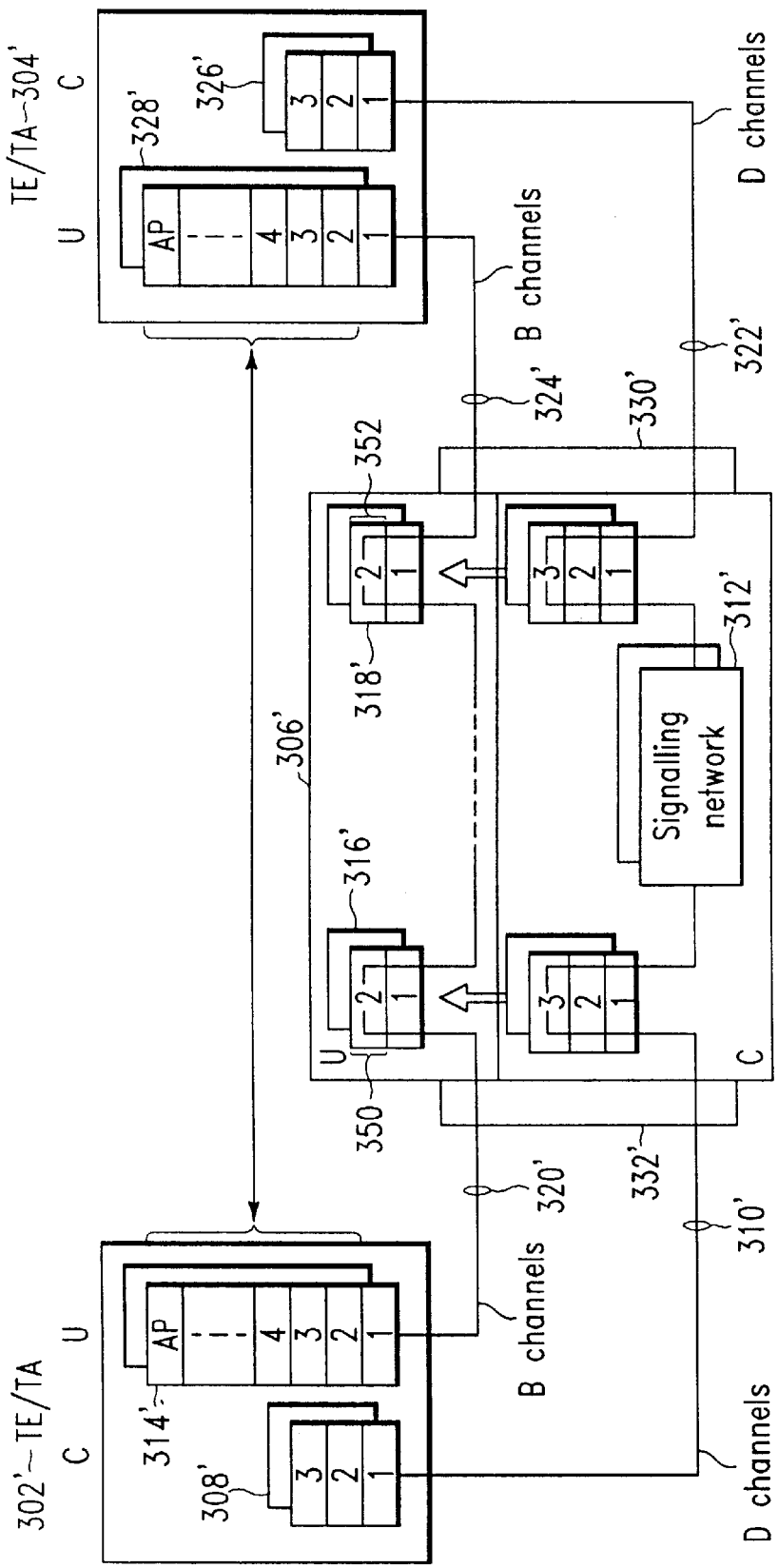
Figure 3C:
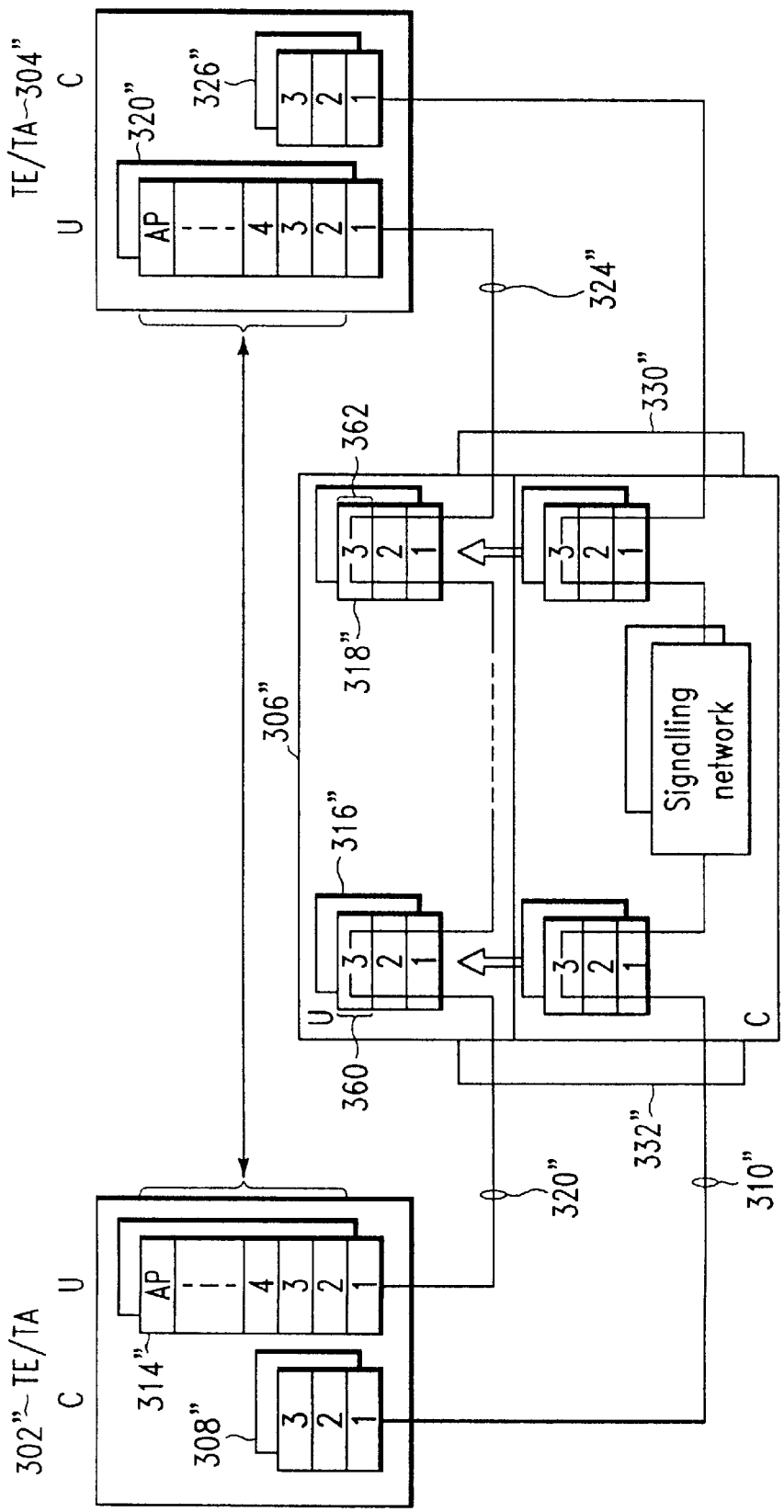
Figure 4:
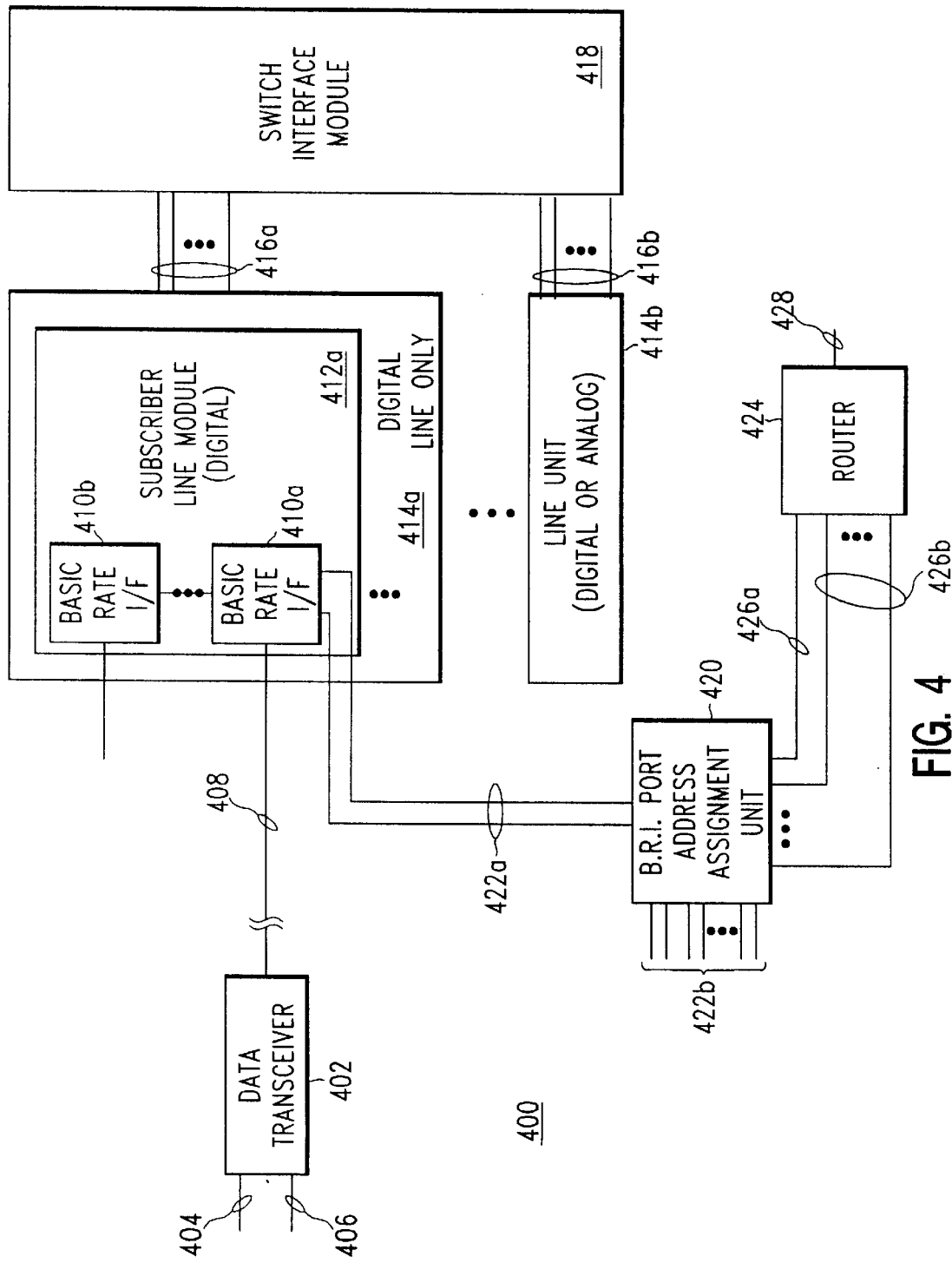
FIG. 4 is a high level block diagram of a device of the invention.

FIG. 4 is a block diagram of a device 400 constructed in accordance with the invention. At the customer premises, a data transceiver 402 is provided which can terminate an asynchronous link (e.g., RS232) 404 from a computer or an Ethernet link 406 from a local area network (or LAN). The data transceiver 402 can be thought of as a dumb data pump which converts data, from RS232 or Ethernet for example, to a 64 Kbps or 124 Kbps data stream. The physical layer (i.e., ISO level one) of the link 408 may employ 2B1Q (i.e., two binary, one quaternary) modulation—an encoding technique (used by ISDN) in which two bits relate to four variations in amplitude and polarity. The link 408 may be comprised of two twisted-pairs for example. In the ISDN vernacular, the data transceiver 402 can be thought of as a terminal adapter (see element 214 of FIG. 2) which maps a previously existing protocol to the ISDN protocol. However, the device 400 differs from the ISDN protocol in that only bearer channels are used—no data channel is needed.

Figure 1A:
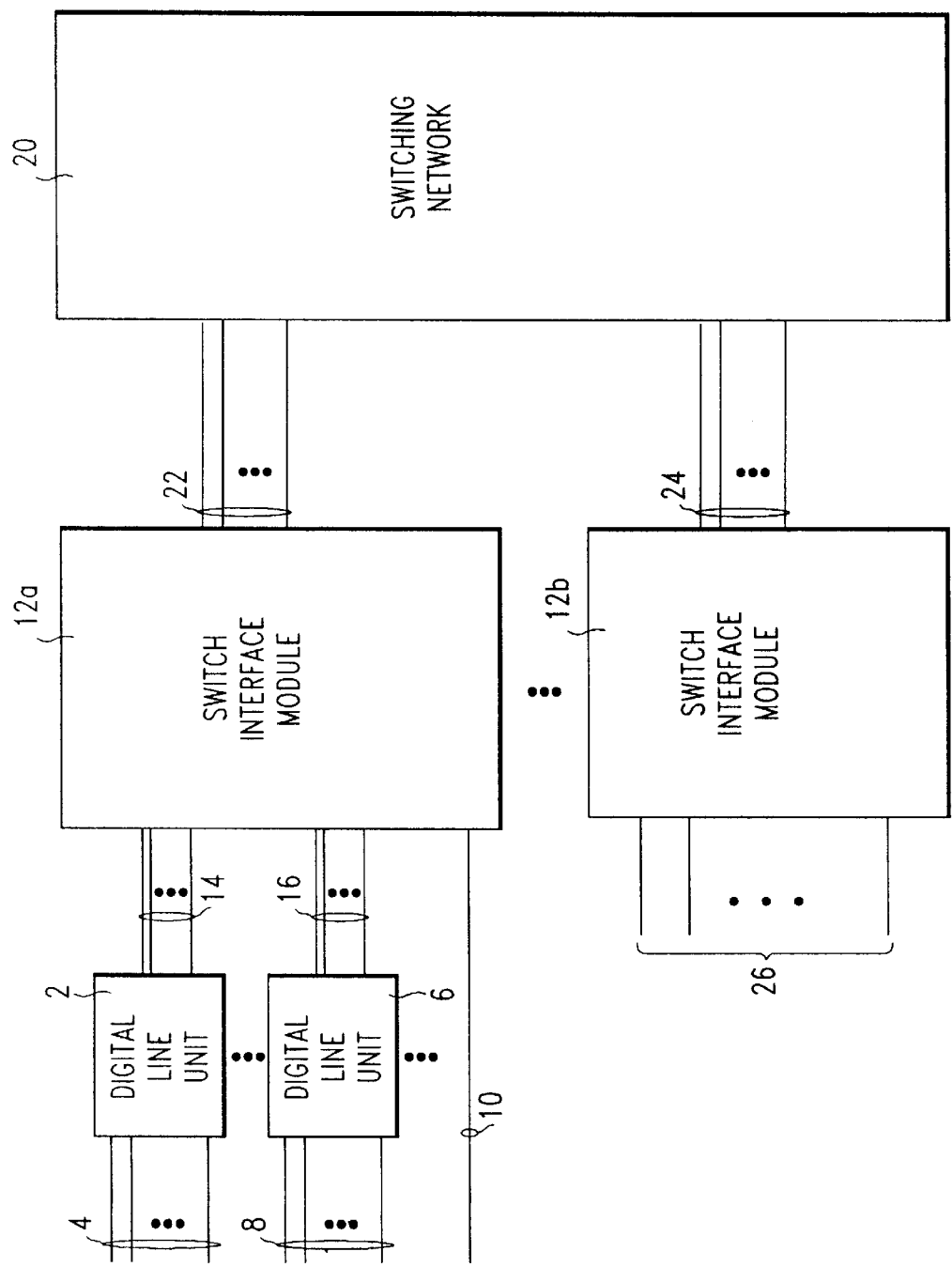
FIG. 1a is a high level block diagram of known devices used at central offices of telephone service providers.
Figure 1B:
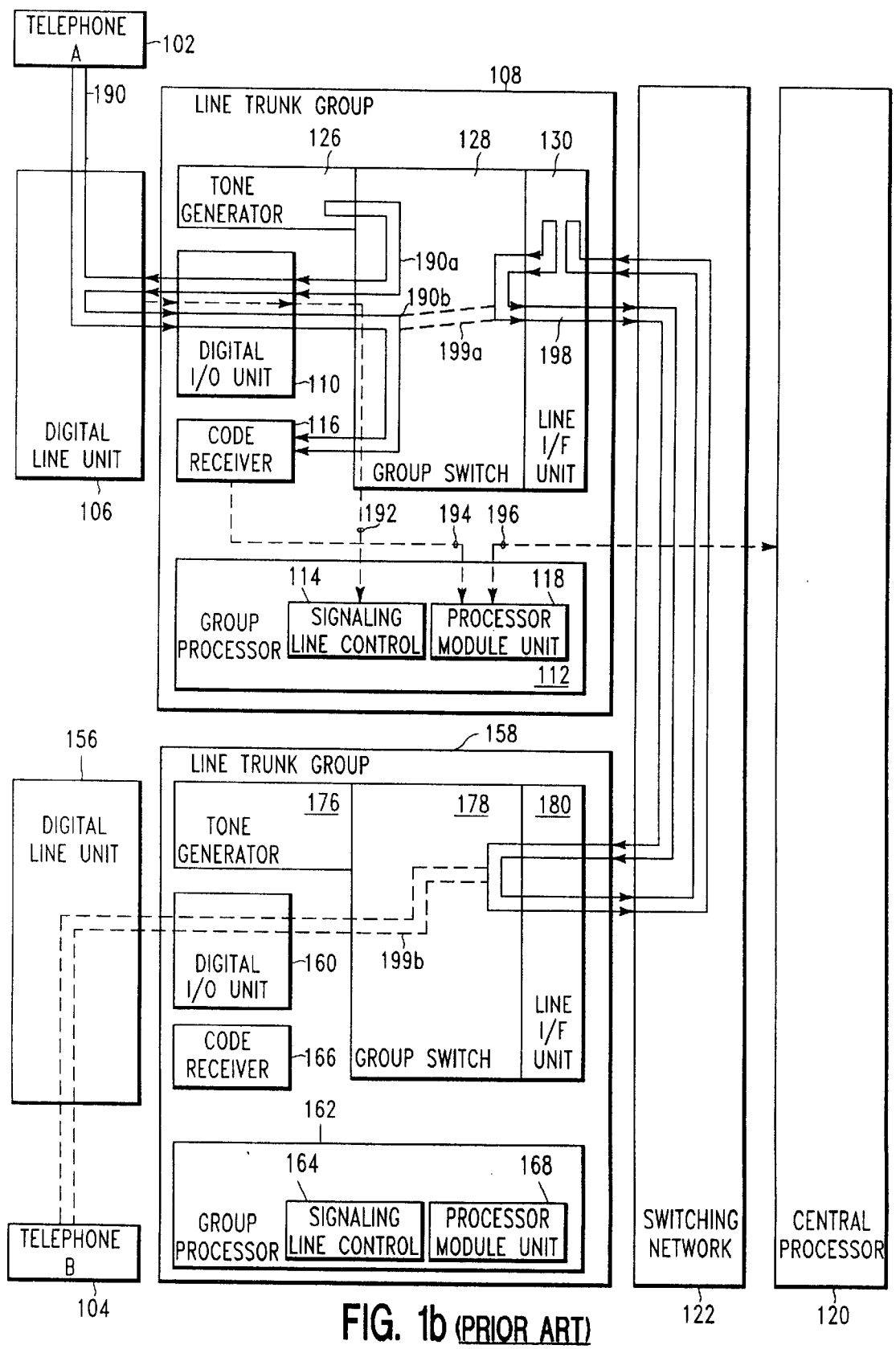
FIG. 1b is block diagram of a known switch used at central offices of telephone service providers.

At a central office or local exchange, the link 408 is terminated at a digital line unit 414 (See e.g., digital line units 106 and 156 of the ESWD® switch in FIG. 1b.) More specifically, a basic rate interface (or "BRI") unit 410a of a subscriber line module (digital) unit 412a of the digital line unit 414a, which is typically used to terminate ISDN lines, may terminate the link 408. In the device 400, rather than providing one (1) or two (2) 64 Kbps channels through the digital line unit 414a and through the switch interface module 418 (See e.g., the line trunk groups 108, 158 of the ESWD O switch in FIG. 1b.) for access to a switching network (not shown—see element 20 of FIG. 2), the BRI unit 410a provides data, via one or both 64 Kbps links 422, to a BRI port address assignment unit 420. Each of the two (2) links 422 may comprise a twisted pair.

The BRI port address assignment unit 420 provides a temporary source address to data received from the BRI 410a. For example, the address may be formatted to comply with TCP/IP (Transmission Control Protocol/Internet Protocol). However, other open or proprietary addressing schemes may be used. The BRI port address assignment unit 420 also matches the address with the BRI port 410a from which the data is received.

The IP subset of the TCP/IP suite corresponds to the network layer (level 3) of the ISO model and provides the addressing needed to allow routers to forward packets across a multiple LAN inter-network. IP addresses are 32 bits long and have two parts—a network identifier and a host identifier. The network identifier specifies the address, which is unique across the Internet, for each network or a related group of networks. The host identifier, which is assigned by a local network administrator, identifies a particular host, station, or node within a given network. The host identifier need only be unique within the particular network identified by the network identifier.

Figure 7:
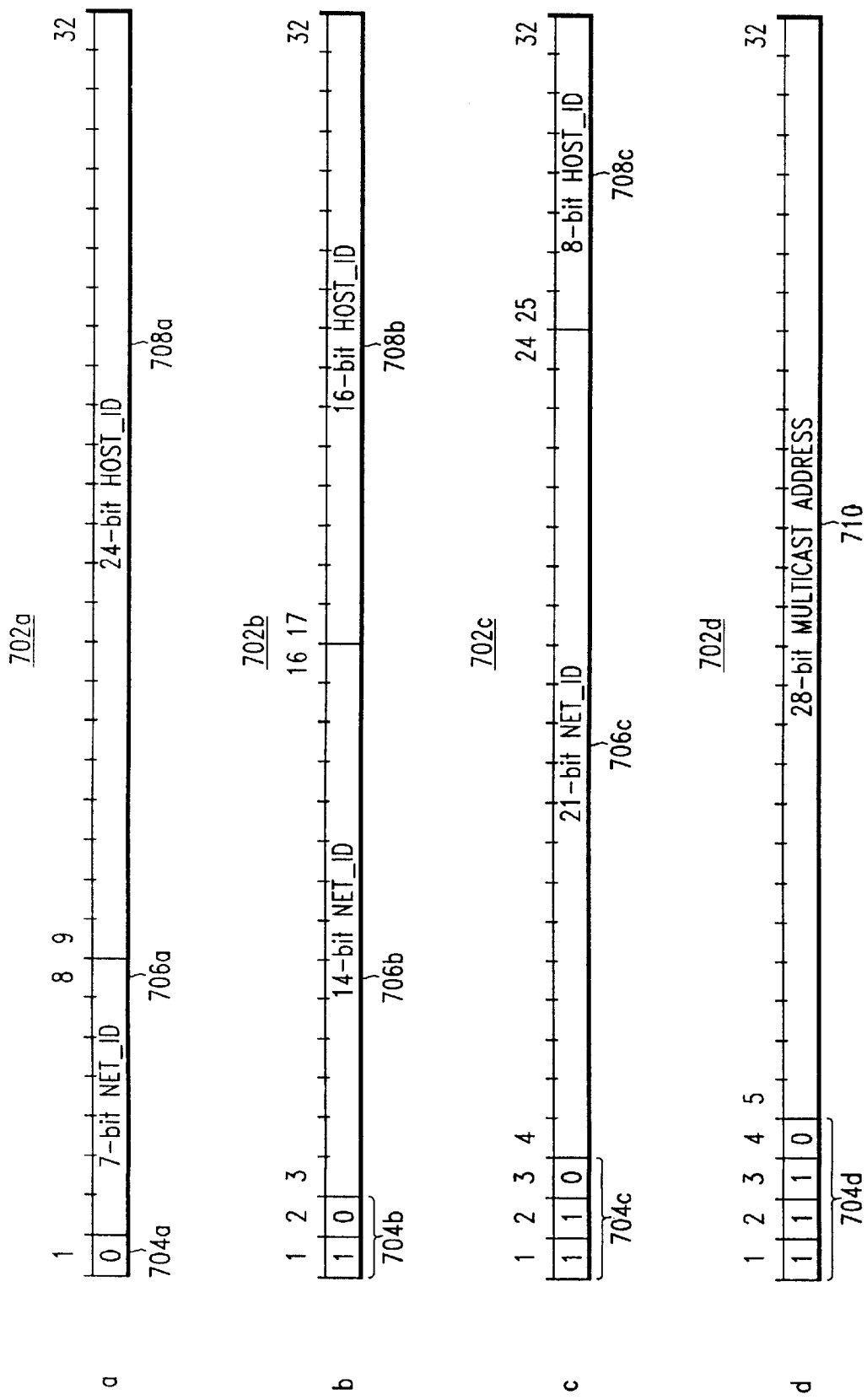
FIGS. 7a through 7d are known data structures used for addressing data in accordance with the Internet protocol (or "IP")

More specifically, FIGS. 7a through 7d illustrate the data structures used for three different addressing schemes and one multicasting scheme in accordance with the Internet protocol. FIG. 7a illustrates the data structure 702a of an IP address intended for use with a relatively small number of networks, at least some of which have a relatively large number of hosts. The first bit (bit 1) 704a of the 32 bit IP address 702a indicates the type of Internet address that follows. In this case, a seven (7) bit network identifier (NET_ID) 706a and a 24 bit host identifier (HOST_ID) 708a are provided.

FIG. 7b illustrates the data structure 702b of an IP address intended for use with relatively medium sized networks. The first two bits (bits 1 and 2) 704b of the 32 bit IP address 702b indicate an Internet address having a 14 bit NET_ID 706b and a 16 bit HOST_ID 708b.

FIG. 7c illustrates the data structure 702c of an IP address intended for use with a relatively large number of networks, each having a relatively small number of hosts. The first three bits (bits 1, 2, and 3) 704c indicate an Internet address having a 21 bit NET_ID 706c and an eight (8) bit HOST_ID 708c.

Finally, FIG. 7d illustrates a data structure 702d of an IP address intended for broadcasting data. The first four (4) bits (bits 1, 2, 3, and 4) 704d indicate a 28 bit multicast address 710. The TCP subset of the TCP/IP suite corresponds to the transport layer (level 4) of the ISO model and provides end-to-end connectivity (e.g., connection management, error control, fragmentation, and flow control) between a source and a destination.

To reiterate, the TCP/IP addressing scheme is presented only as an example. The BRI port address assignment unit 420 may use other known addressing protocols or, alternatively, a proprietary addressing scheme to assign temporary addresses to the BRI port(s) 410 and to the data. As shown in FIG. 4, the BRI port address assignment unit 420 may accept other 64 Kbps channel pairs 422b, e.g., from other BRI interface units 410 which terminate other links 408' (not shown) from other data transceivers 402' (not shown). In any event, the data, tagged with the source address, are provided, via link 426a to a router 424. The router 424, using a destination address contained in the original data, routes the data to an appropriate BRI 410' for communication, via a link 408', to an addressed device.

Figure 8:
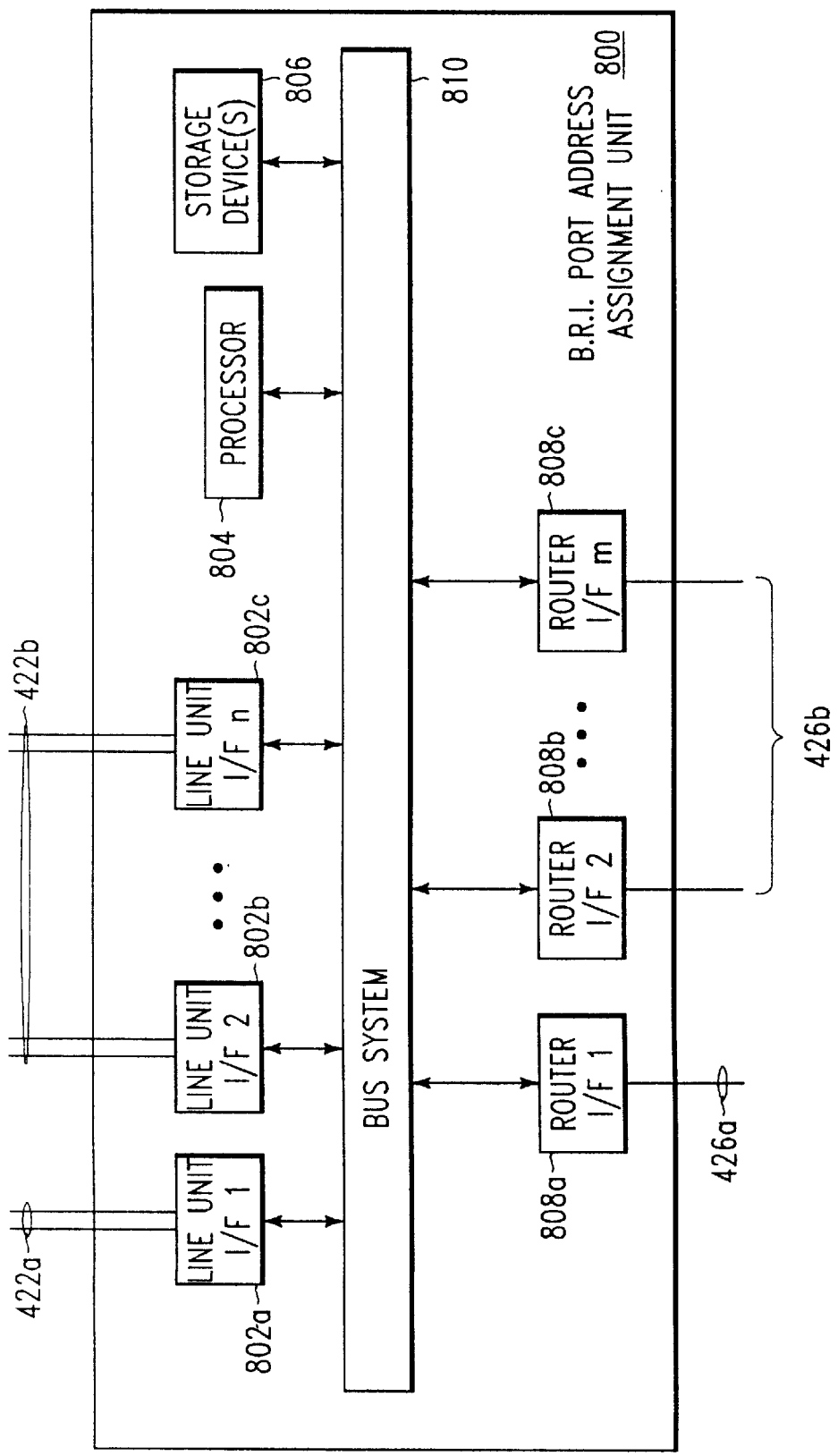
FIG. 8 is a high level block diagram of an address assignment unit which may be used with the devices of the invention.

FIG. 8 is a high level block diagram of an address assignment unit 800 which may be used as the BRI port address assignment unit 420 shown in FIG. 4. The address assignment unit 800 includes a number (e.g., n, where n is at least 1) of line unit interface units 802, a number (e.g., m, where m is at least one and preferably less than n) of router interface units 808, a processor 804, and a storage device 806 sharing a bus system 810. The processor 804, operating under the control of instructions stored in a program storage portion of the storage device(s) 806, assigns an address to each BRI unit 410. Since, in this exemplary embodiment, each BRI unit 410 is hardwired to a line unit interface 802, the processor may use a look up table, stored in storage device(s) 806, to associate a logical or temporary address with each line unit interface 802, and thus, with each BRI unit 410. The data is also tagged with the source address.

The processor 804 also forwards data, via an available one of the router interface(s) 808 and an associated link 426, to the router 424. Although, as shown in FIG. 8, each of the line unit interface units 802 may accept two (2) 64 Kbps bearer (or "B") channels, the first device 400 of the invention may be configured such that each of the line unit interface units 802 accept a single 64 Kpbs bearer (or "B") channel.

Figure 5:
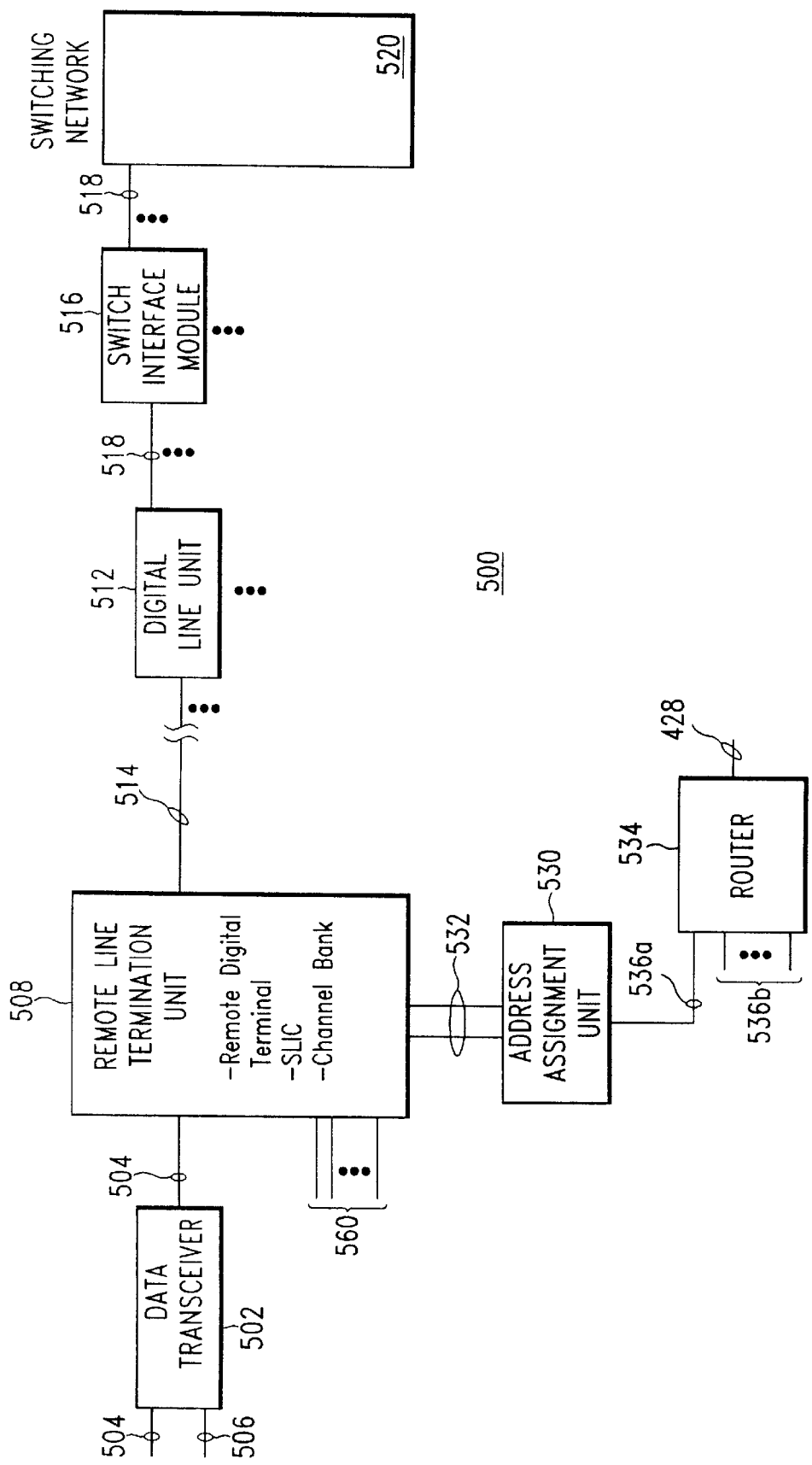
FIG. 5 is a high level block diagram of a second device of the invention.
Figure 6:
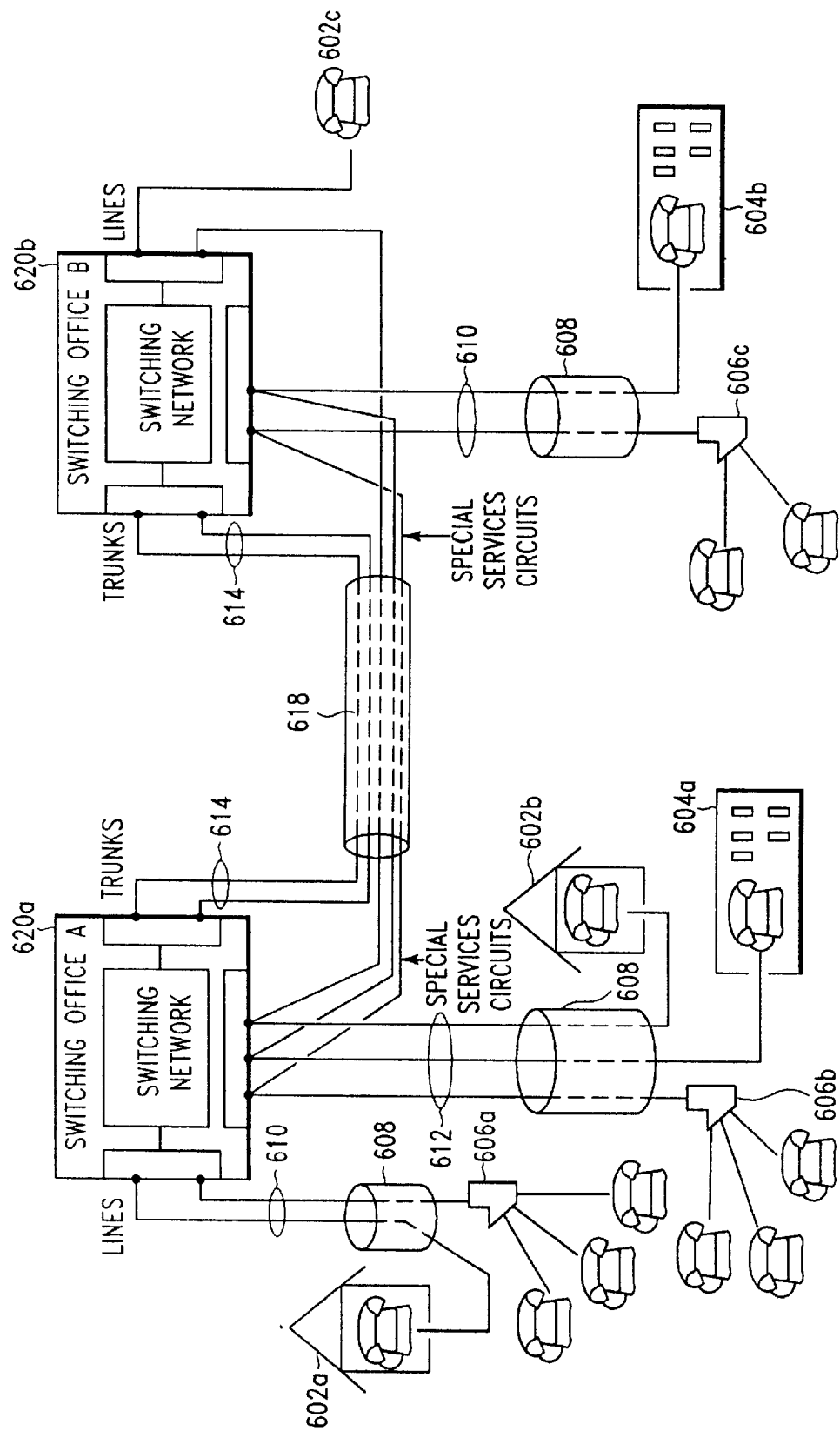
FIG. 6 is a block diagram illustrating the use of transmission facilities by various types of services.

FIG. 5 is a block diagram of a second device 500 constructed in accordance with the invention. At the customer premises, a data transceiver 502 is provided which can terminate an asynchronous link (e.g., RS232) 504 from a computer or an Ethernet link 506 from a local area network (or LAN). The data transceiver 502 can be thought of as a dumb data pump which converts data, from RS232 or Ethernet for example, to a 64 Kbps or 124 Kbps data stream. In the ISDN vernacular, the data transceiver 502 can be thought of as a network termination type 2 which maps a previously existing protocol to the ISDN protocol. (See e.g., element 206 of FIG. 2.) However, the device 500 differs from the ISDN protocol in that only bearer channels are used. At the customer premises, the data transceiver 504 is coupled, via link 510, with a remote line termination unit 508. The remote line termination unit 508 may be a remote data terminal, a subscriber line interface circuit (or "SLIC"), etc. In any event, the remote line termination unit 508 can be thought of as a digital line unit (See e.g., elements 414a and 414b of FIG. 4.) or a digital subscriber line module (See e.g., element 412a of FIG. 4.) located at the customer premises rather than the central office or local exchange.

In any event, the remote line termination unit provides one (1) or two (2) bearer (or "B") channels 532 to an address assignment unit 530 which provides the data to a router 534 via link 536. The address assignment unit 530 can have a structure similar to the address assignment unit 420 of the first device 400 of the invention. However, in this case, the processor 804 generates a look up table, stored in storage device(s) 806, which associates the line unit interfaces 802 with a terminal of the remote line termination unit. Similarly, the router 534 can have a structure similar to the router 424 of the first device 400.

Other lines 560 (e.g., twisted pairs coupled with telephones or modems) provided to the remote line termination unit 508 are provided, via link 514, to a central office where the data is processed in the normal manner. (See e.g., FIG. 1b and the associated description.)

Figure 9A:
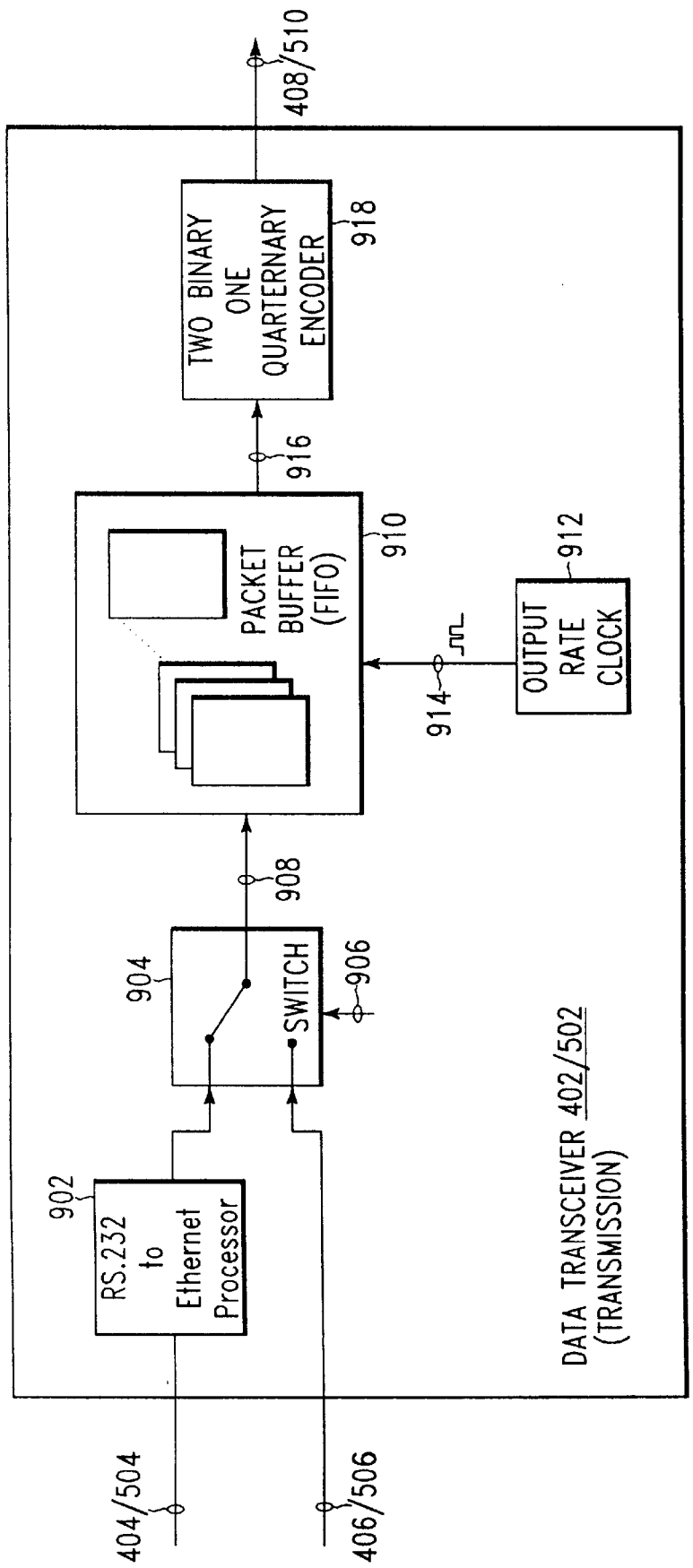
FIGS. 9a and 9b are high level block diagrams of a transmission stage and a reception stage, respectively, of a data transceiver of the devices of the invention.
Figure 9B:
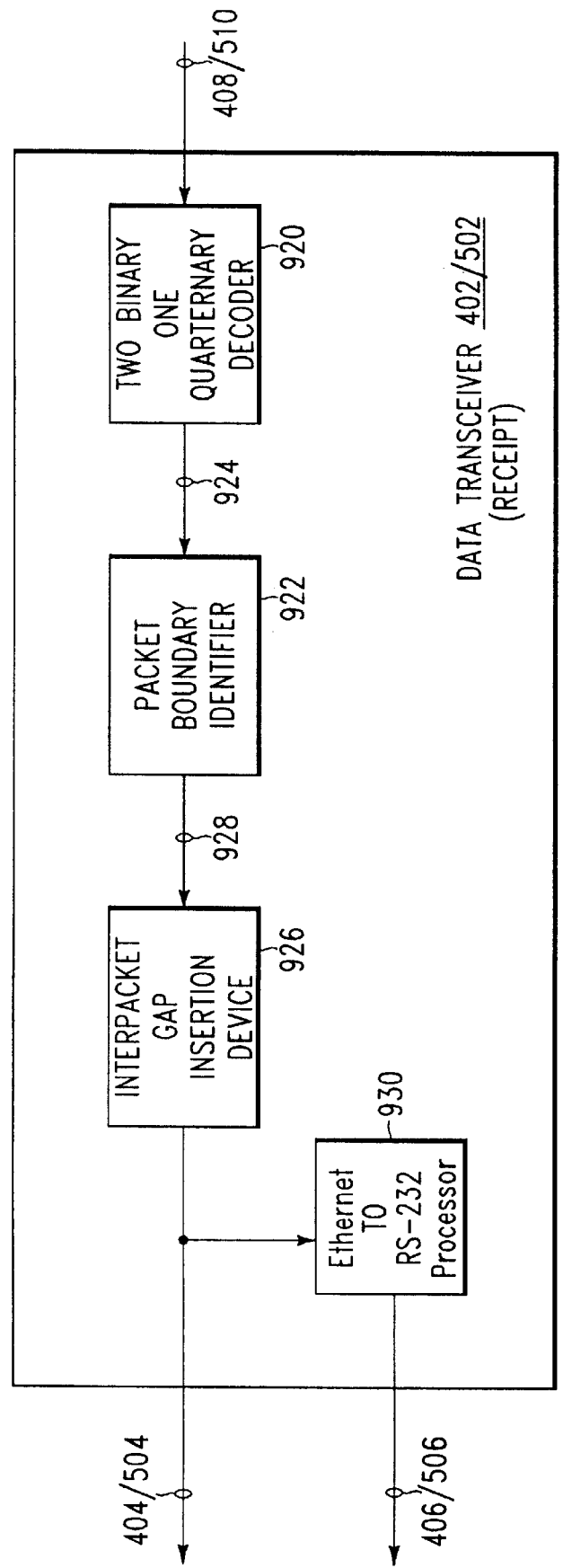

FIGS. 9a and 9b are a high level block diagrams of a transmission stage and a reception stage, respectively, of a data transceiver 402/502 of the devices of the invention. Referring to FIG. 9a, on the transmission stage, an RS-232 bus 404/504 and a 10 Base T line carrying Ethernet 406/506 are terminated at the data transceiver 402/502. RS-232 asynchronous data is packetized into Ethernet packets (See e.g., FIG. 10c discussed below) by RS.232 to Ethernet processor 902. Switch 904 selects, based on a selection input 906, Ethernet data packets provided by the RS.232 to Ethernet processor or provided on the 10 Base T line 406/506. The output 908 of the switch 904 is provided to a packet buffer 910. The packet buffer 910 may include a FIFO memory device, the contents of which are clocked out at 64 Kbps or 128 Kbps.

Figure 10A:
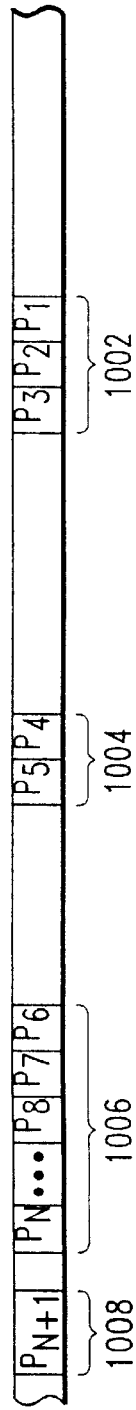
FIG. 10a illustrates an example of Ethernet traffic.
Figure 10B:
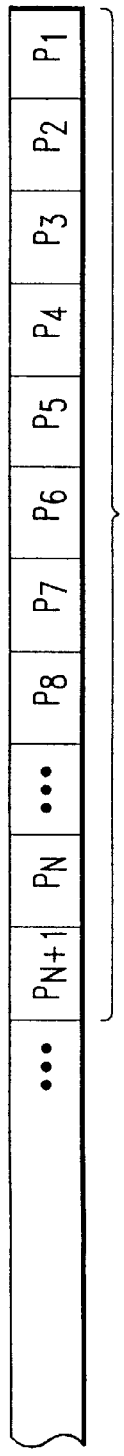
FIG. 10b illustrates the Ethernet traffic of FIG. 10a placed on a 64 or 128 Kpbs line.

Basically, the packet buffer 910 serves to smooth bursts of high speed data. More specifically, as shown in FIG. 10a, the packet buffer 910 may receive data 908 in high speed (e.g., 10 Mbps) bursts of one (1) or more Ethernet packets. For example, in the example of FIG. 10a, the data 908 includes a first burst 1002 of packets $P_1$-$P_2$-$P_3$, a second burst 1004 of packets $P_4$-$P_5$, a third burst 1006 of packets $P_6$ through $P_N$, and a fourth burst 1008 including packet $P_{N+1}$. These bursts of packets are buffered, in a first-in-first-out (or "FIFO") manner, and clocked out, in response to clock pulses 914 from output rate clock 912, at 64 Kbps or 128 Kbps. FIG. 10b illustrates a constant bit rate stream 916 of data. As can be seen from FIG. 10b, in a preferred embodiment, no overhead is added. That is, the packets are not further encapsulated—they are merely pumped out at a constant rate.

Figure 10C:
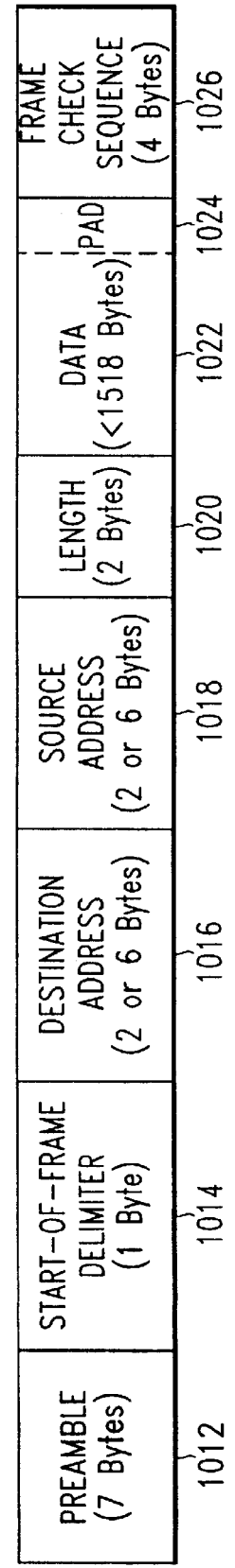
FIG. 10c illustrates the data structure of an Ethernet packet.

FIG. 10c illustrates the data structure of an Ethernet packet (e.g., 1008). As shown in 10c, an Ethernet packet includes (i) a preamble field 1012, (ii) a start-of-frame delimiter field 1014, (iii) a destination address field 1016, (iv) a source address field 1018, (v) a length field 1020, (vi) a data field 1022, (vii) an optional padding field 1024, and (vii) a frame check sequence field 1026. The preamble field 1012 is seven (7) bytes and repeats the binary pattern 10101010 to allow receiving electronics to achieve bit synchronization before any actual frame contents are received. The start-of-frame delimiter field 1014 is one (1) byte and signals the start of a valid frame with the binary pattern 10101011. The length field 1020 is two (2) bytes and indicates the number of bytes in the data field 1022. If the value is less than a minimum number required for a valid frame (i.e., minimum frame size), a sequence of bytes is added to the padding field 1024. The frame check sequence filed 1026 includes a four (4) byte cyclic redundancy check value used for error-detection.

Referring back to FIG. 9a, the fixed bit rate stream 916 of packets is provided to a two binary, one quaternary (2B1Q) encoder 918 which encodes the data for transmission over link 408/510.

Referring to FIG. 9b, on the reception stage, a two binary, one quaternary decoder 920 decodes incoming data from link 408/510. The decoded bitstream 924 is then provided to a packet boundary identifier 922 which identifies packet boundaries based on known fields of the Ethernet packet 1008. These packets are then forwarded, via link 928, to an inter-frame gap insertion device 926 which inserts 9.6 µs (or greater) gaps between the packets as is required by the Ethernet standard. The properly gapped packets are then provided, for example, to a LAN via link 404/504 or to an RS.232 device via Ethernet to RS.232 converter 930. The converter 930 basically strips the data from the data fields 1022 of Ethernet packets 1008.

Figure 11:
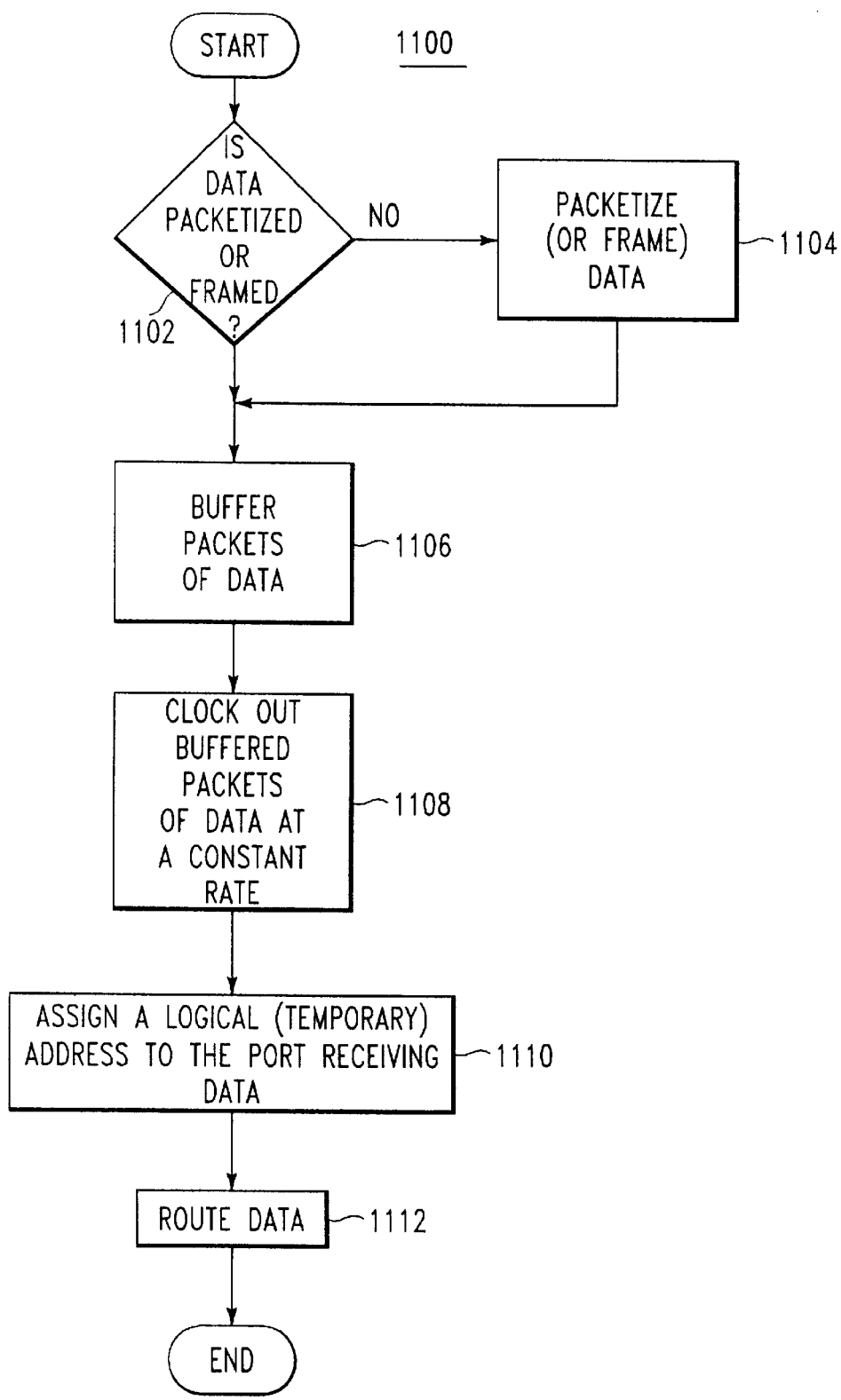
FIG. 11 is a flow diagram of a method of the invention.

FIG. 11 is a flow diagram of a method carried out in accordance with the invention. First, as shown in step 1102, it is determined whether or not data provided is encapsulated (e.g., packetized or framed). If the data is not encapsulated, it is framed as shown in steps 1102 and 1104. Recall for example, that RS-232 data may be framed into Ethernet packets by RS-232 to Ethernet processor 902. Next, as shown in step 1106, the frames or packets of data are buffered. This step may be carried out by a FIFO buffer. (See e.g., packet buffer 910 of FIG. 9a.) Next, as shown in step 1108, the buffered packets or frames of data are clocked out at a constant rate data, such as 64 Kbps or 128 Kbps for example.

Next, as shown in step 1110, a logical or temporary address is assigned to a port receiving the data. To reiterate, the address may be in the form of a TCP/IP compliant address (See e.g., FIGS. 7a–7d) and may be assigned by a processor in accordance with a stored program (See e.g., processor 804 and storage device(s) 806 of FIG. 8.). In the first device 400 shown in FIG. 4, the data is provided to an address assignment unit 420 via a basic rate interface 410 of a subscriber line module (digital) 412 of a digital line unit 414, and link(s) 422. In the second device 500 shown in FIG. 5, the data is provided to an address assignment unit 530 via a remote line termination unit 508 and link(s) 532. The data itself may also be tagged with the address.

Finally, a shown in step 1112, the data is routed, for example, by a router 424,534. The router 424,534 routes the data, based on destination information, (a) to another network via link 428, (b) to another data transceiver 502, via address assignment unit 420, another link(s) 422, another basic rate interface unit 410, and another link 408, and/or (c) to another data transceiver 502, via address assignment unit 530, another link(s) 532, another port of a remote line termination unit 508, and another link 510.

The embodiments described herein are merely illustrative of the principles of the present invention. Various modifications may be made thereto by persons ordinarily skilled in the art, without departing from the scope or spirit of the invention.

What is claimed is:

1. A device for communicating data from a first location, via a central office having at least one digital line unit, to a router at a second location, comprising:
   a) a data transceiver,
      i) being located at the first location,
      ii) accepting the data, and
      iii) generating a constant rate data stream from the data;
   b) a first link,
      i) being coupled with the data transceiver, and
      ii) carrying the constant rate data stream generated by the data transceiver;
   c) a line termination unit,
      i) being located on the at least one digital line unit, and
      ii) terminating the first link;
   d) a second link,
      i) being coupled with the line termination unit, and
      ii) carrying the constant rate data stream; and
   e) an address assignment unit,
      i) terminating the second link,
      ii) assigning an address to the line termination unit, and
      iii) providing the constant rate data stream to the router.

2. The device of claim 1, wherein the constant rate data stream has a rate data of 64 Kpbs.

3. The device of claim 1, wherein the constant rate data stream has a rate data of 128 Kpbs.

4. The device of claim 1, wherein the line termination unit is a basic rate interface.

5. The device of claim 1, wherein the address assignment unit comprises
   i) a line termination unit interface for terminating the second link, ii) a storage device, storing a program, iii) a processor for executing the program stored in the storage device, iv) a router interface for terminating a link to the router, and v) a bus system, shared by the line termination unit interface, the processor, and the router interface.

6. The device of claim 5, wherein the storage device stores a look up table in which the line termination unit is associated with the address assigned to the line termination unit.

7. The device of claim 5, wherein the storage device stores a look up table in which the line termination unit interface is associated with the address assigned to the line termination unit.

8. A device for communicating data from a first location to a router, the first location having a remote line termination unit, the remote line termination unit coupled, via a link, with a central office, comprising:

a) a data transceiver,
   i) being located at the first location,
   ii) accepting the data, and
   iii) generating a constant rate data stream from the data;

b) a first link,
   i) being coupled with the data transceiver, and
   ii) carrying the constant rate data stream generated by the data transceiver;

c) a line termination node,
   i) being located on the remote line termination unit, and
   ii) terminating the first link;

d) a second link,
   i) being coupled with the line termination node, and
   ii) carrying the constant rate data stream; and e) an address assignment unit,
   i) terminating the second link,
   ii) assigning an address to the line termination node, and
   iii) providing the constant rate data stream to the router.

9. The device of claim 8, wherein the constant rate data stream has a rate data of 64 Kpbs.

10. The device of claim 8, wherein the constant rate data stream has a rate data of 128 Kpbs.

11. The device of claim 8, wherein the address assignment unit comprises i) a line termination node interface for terminating the second link, ii) a storage device, storing a program, iii) a processor for executing the program stored in the storage device, iv) a router interface for terminating a link to the router, and v) a bus system, shared by the line termination node interface, the processor, and the router interface.

12. The device of claim 11, wherein the storage device stores a look up table in which the line termination node is associated with the address assigned to the line termination unit.

13. The device of claim 11, wherein the storage device stores a look up table in which the line termination node interface is associated with the address assigned to the line termination node.

14. In a central office having a digital line unit having a subscriber line module which terminates a number of local lines, a switch interface module coupled with the digital line unit, and a switching network coupled with the switch interface module, a device for communicating to a router a constant rate data stream, received on one of the local lines, comprising:

a) a line termination unit,
   i) being located on the digital line unit, and
   ii) terminating the on e of the local lines;

b) a link,
   i) being coupled with the line termination unit, and
   ii) carrying the constant rate data stream; and c) an address assignment unit,
   i) terminating the link,
   ii) assigning an address to the line termination unit, and
   iii) providing the constant rate data stream to the router, wherein the constant rate data stream bypasses the switching network.

15. The device of claim 14, wherein the line termination unit is a basic rate interface.

16. The device of claim 14, wherein the address assignment unit comprises i) a line termination unit interface for terminating the link, ii) a storage device, storing a program, iii) a processor for executing the program stored in the storage device, iv) a router interface for terminating a link to the router, and v) a bus system, shared by the line termination unit interface, the processor, and the router interface.

17. The device of claim 16, wherein the storage device stores a look up table in which the line termination unit is associated with the address assigned to the line termination unit.

18. The device of claim 16, wherein the storage device stores a look up table in which the line termination unit interface is associated with the address assigned to the line termination unit.

* * * * *